April 19, 1932. L. B. ERWIN 1,854,182
DEVICE FOR EQUALIZING THE STRAIN ON A GROUP OF SUSPENSION CABLES
Filed Oct. 9, 1929
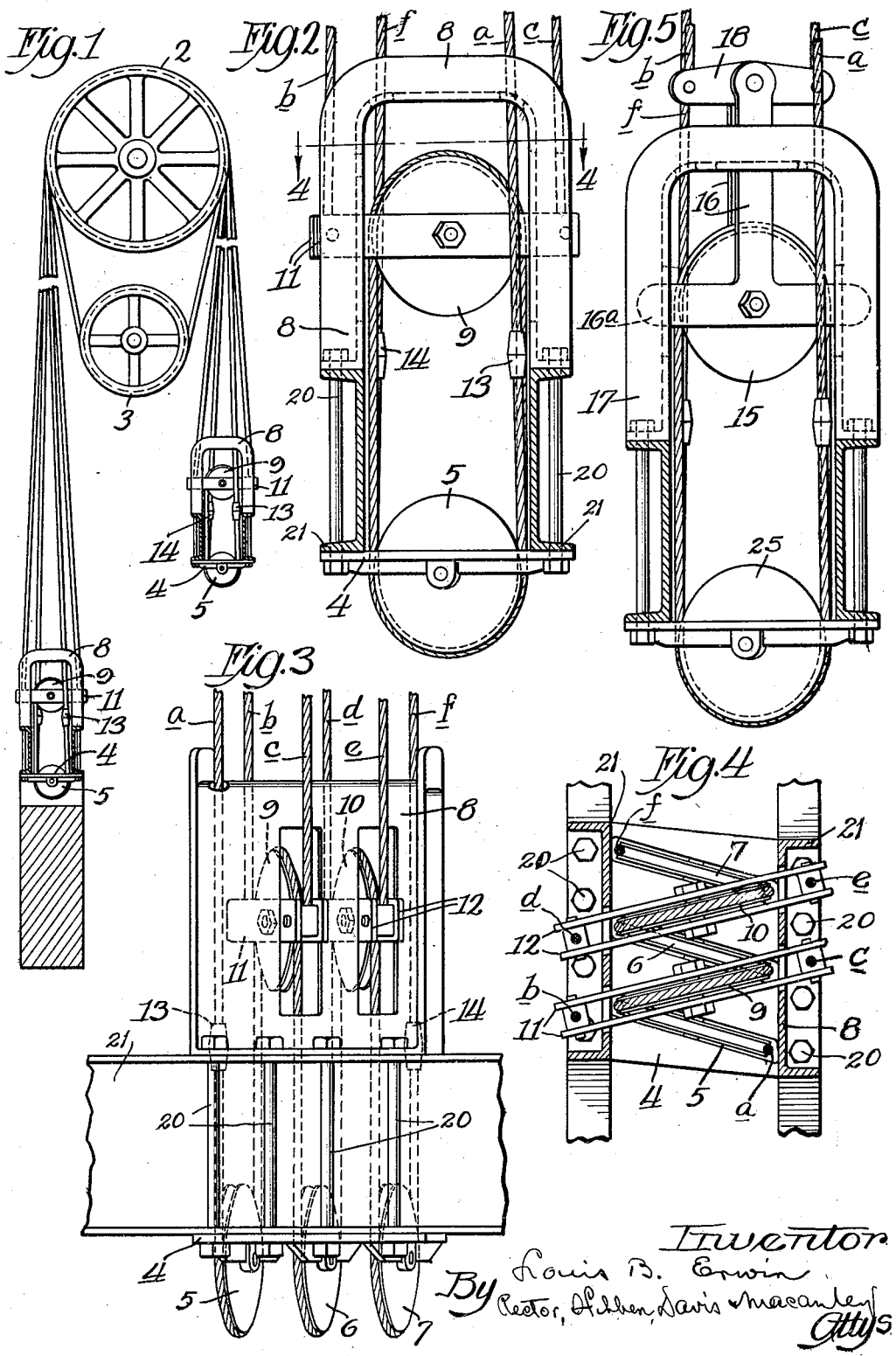

Patented Apr. 19, 1932

1,854,182

UNITED STATES PATENT OFFICE

LOUIS B. ERWIN, OF CHICAGO, ILLINOIS, ASSIGNOR TO EVANS ELEVATOR EQUALIZER COMPANY, OF BEDFORD, INDIANA, A CORPORATION OF INDIANA

DEVICE FOR EQUALIZING THE STRAIN ON A GROUP OF SUSPENSION CABLES

Application filed October 9, 1929. Serial No. 398,511.

My invention relates to a device devised for equalizing the strain upon the members of a group of cables used to support a load, as that of an elevator car, or the counterweight of such a car, and is intended for application to a group of six, or eight, or any even number of cables.

My novel device is of the type in which the suspension cables are connected to the car or other load through rigging which acts to equalize the strain on the cables, and its object is the provision of a novel arrangement of the cable connections and rigging of a device of such type which shall serve the purpose of equalizing the strains upon the cables in a simple, efficient and desirable manner. In the appended claims I have more particularly pointed out the essential elements of my invention.

Figure 1 of the drawings which accompanies this specification is what I will term a side view showing, on a small scale, portions of an elevator car and counterweight and two of my devices connecting the suspension cables to the car and counterweight, severally;

Fig. 2 is a side view, on a larger scale, of my novel suspension device;

Fig. 3 is a view of the same, viewed at right angles to the position illustrated in Fig. 2;

Fig. 4 is a horizontal section of the device in a plane indicated by the dotted line 4—4 of Fig. 2; and Fig. 5 is a side view of a suspension device embodying my invention in a modified form.

Like reference characters indicate like parts in all the figures of the drawings.

While my invention may be applied to different kinds of elevators, I have illustrated in Fig. 1 one well known arrangement in which the hoisting cables, which may be assumed to be six in number are connected by means of one of my suspension devices to a counterweight, and lead from the counterweight around parallel grooves, i. e. similar circumferential grooves, formed in the periphery of the hoisting drum or pulley 2; thence around grooves in an idler pulley 3; thence again around the pulley 2 in grooves which are intermediate the first mentioned grooves; and thence lead to the elevator car, to which they are connected by one of my suspension devices.

My suspension device may be said to include the equalizing rigging and two frame parts, a lower part consisting of a plate 4, formed with bearings in which are mounted a set of parallel lower sheaves marked 5, 6 and 7, and an upper part, consisting of a frame 8 which serves as a safety and guide member for an upper set of parallel sheaves, marked 9 and 10.

As illustrated, see Figs. 2 and 4, the plate 4 and frame 8 are clamped by bolts 20 to frame members 21 forming part of the frame of the car or other load to be supported, so that the pivotal bearing of the lower sheaves is secured to and sustains the weight of the load.

It will be observed (see Fig. 4) that the equalizing sheaves and the upper sheaves are arranged in angular relation so that the strands of the suspension rigging will track vertically, or approximately so, between the grooves of the two sets.

Each of the upper sheaves is pivotally mounted centrally between a pair of twin equalizer bars extending through vertical guide slots in the frame 8, the sheave 9 being pivoted between the equalizing bars 11—11, and the sheave 10 being pivoted between the equalizing bars 12—12. These equalizing bars are connected to the inner suspension cables (the cables $b$, $c$, $d$ and $e$, lying between the outer cables $a$ and $f$ in the order in which they track upon the hoisting pulley) in split pairs, the equalizing bars 11—11 being connected at one end to the suspension cable $b$, (in the present instance by means of pivot blocks secured to the cables and pivoted in bearings at the ends of the equalizing bars), and at the other end in like manner to the suspension cable $c$, and the equalizing bars 12—12 being similarly connected at one end to the cable $d$ and at the other end to the cable $e$, so that each pair in effect constitutes an oscillating member which functions as a single bar.

Tracing now the connections of the equalizing rigging, the suspension cable $a$ passes downwardly around the lower sheave 5, and thence around the upper sheaves and remaining lower sheaves in alternation, the rigging engaging in succession the outer lower sheave 5 just mentioned, then the upper sheave 9, then the inner lower sheave 6, then the upper sheave 10, and then the other outer lower sheave 7, the outer strand of the rigging being connected to the suspension cable $f$. The outer suspension cables $a$ and $f$ thus track directly into the two extreme or outermost lower sheaves, while the strands connecting such cables form an intermediate rigging section of the connected equalizing rigging which tracks between the lower and upper sheaves in alternation, and with the connected ends of said cables constitutes an equalizing rigging. This intermediate portion or section of the rigging may, of course, be separately formed if desired and, as a safety measure, the ends of such equalizing section are equipped with stops, marked 13 and 14, which in event of breakage of one of the cables $a$ and $f$, will bring up against the bottom plate 4 and prevent the loose end of the central equalizing portion of the connected rigging running through the sheaves. The equalizer bars 11—11 and 12—12, it will be noted, are so connected with the upper sheaves 9 and 10 that they cannot escape from the guide frame 8, so that in case of breakage of any one or more of the suspension cables the weight of the car will be sustained by the remaining cables.

The cables $a$, $c$, and $e$, it will be noted, lead from the hoisting pulley to the sheaves of the equalizer device in one side of a central vertical plane, while the other three cables $b$, $d$ and $f$ are disposed at the opposite side, and the two groups, due to the angular positioning of the upper and lower sheaves, are in staggered arrangement such that the cables will track properly into the grooves of the hoisting pulley.

In the modified form of device illustrated in Fig. 5, the two upper pulleys, the one visible being marked 15, are each pivotally mounted in a hanger consisting of twin hanger bars 16, having horizontal lower portions 16$^a$ extending laterally through slots in the frame member 17 of the device, the vertical portions of the hanger extending through slots in the top of said frame member and being pivotally connected to oscillating members which in the present instance, though not necessarily, consists of twin equalizer bars 18, corresponding in purpose to the pairs of twin equalizer bars 11—11 and 12—12 of the form of my invention previously described and connected to the inner four suspension cables $b$, $c$, $d$ and $e$ in like manner. The outer cables $a$ and $f$ are connected by an equalizing section which successively engages three lower sheaves corresponding to the lower sheaves 5, 6 and 7 of the form of my device previously described (the lower sheave visible in Fig. 5 being marked 25), and the two upper sheaves 15 in alternation in the same manner as in the form of device first above described.

While my equalizing device has been described as applied to a group of six suspension cables it is obvious that by the addition of additional upper sheaves and corresponding lower sheaves (or omitting one upper sheave and one lower sheave of those described), the connections of the cables being correspondingly modified, my invention may be applied to any even number of suspension cables from four to such number as may be desired, and it will be understood that in the above description and in the claims mention of the number of sheaves and other parts are intended to be understood in the plural or singular number, with reference to a given variation from the particular number of parts described and illustrated.

It is further obvious that by employing two of my novel suspension devices to connect the car and the counterweight severally to the portions of the cables on opposite sides of the hoisting drum, the portions of the cables on opposite sides of the hoisting pulley will all be perfectly equalized at all times.

I claim:

1. A strain equalizing device for connecting a load to a group of suspension cables engaging parallel grooves in a hoisting pulley, said device comprising oscillating members connected to the inner ones of said suspension cables in pairs, a like number of upper sheaves pivotally connected to said oscillating members, and lower sheaves one greater in number than said upper sheaves pivotally secured to said load, the outer suspension cables of said group being arranged to directly engage the outer lower sheaves and being connected to form an intermediate rigging section arranged to also engage the upper sheaves and inner lower sheave in alternation.

2. A strain equalizing device for connecting a load to a group of an even number of suspension cables engaging parallel grooves in a hoisting pulley, said device comprising a plurality of parallel equalizing bars connected at their opposite ends to the inner ones of said equalizing cables in spread pairs, a plurality of parallel upper sheaves pivotally connected to said equalizing bars centrally thereof, and a plurality of parallel lower sheaves pivotally secured to the load, the outer suspension cables of said group being arranged to directly engage the outer lower sheaves and being connected to form an intermediate rigging section arranged to also engage the upper sheaves and inner lower sheave in alternation.

3. A strain equalizing device for connecting a load to a group of an even number of suspension cables engaging parallel grooves in a hoisting pulley, said device comprising a plurality of oscillating members connected to spread pairs of the inner ones of said cables, a like plurality of hangers severally pivotally connected at their upper ends to said oscillating members, a like plurality of parallel upper sheaves pivoted to the lower ends of said hangers, a set of lower sheaves pivoted to said load, the two outer suspension cables being arranged to directly engage the outer lower sheaves and being connected to form an intermediate rigging section arranged to also engage the upper sheave and the inner lower sheave in alternation.

4. A strain equalizing device for connecting a load to a group of suspension cables engaging parallel grooves in a hoisting pulley, said device comprising oscillating members connected to the inner ones of said suspension cables in pairs, a like number of upper sheaves pivotally connected to said oscillating members, and lower sheaves one greater in number than said upper sheaves pivotally secured to said load, the outer suspension cables of said group being arranged to track directly into the outer lower sheaves and being connected to form an intermediate rigging section arranged to track between said lower and upper sheaves in alternation.

5. A strain equalizing device for connecting a load to a group of an even number of suspension cables engaging parallel grooves in a hoisting pulley, said device comprising a plurality of parallel equalizing bars connected at their opposite ends to the inner ones of said equalizing cables in spread pairs, a plurality of parallel upper sheaves pivotally connected to said equalizing bars centrally thereof, and a plurality of parallel lower sheaves pivotally secured to the load, the outer suspension cables of said group being arranged to track directly into the outer lower sheaves and being connected to form an intermediate rigging section arranged to track between said lower and upper sheaves in alternation.

6. A strain equalizing device for connecting a load having frame members to a group of an even number of suspension cables engaging parallel grooves in a hoisting pulley, said device comprising a plurality of parallel equalizing bars connected at their opposite ends to the inner ones of said equalizing cables in spread pairs, a plurality of parallel upper sheaves rotatably mounted in said equalizing bars centrally thereof, and a plurality of parallel lower sheaves rotatably mounted on the frame members of the load, the outer suspension cables of said group, being arranged to track directly into the outer lower sheaves and being connected to form an intermediate rigging section arranged to track between said lower and upper sheaves in alternation.

7. A strain equalizing device for connecting a load to a group of an even number of suspension cables engaging parallel grooves in a hoisting pulley, said device comprising a plurality of oscillating members connected to spread pairs of the inner ones of said cables, a like plurality of hangers severally pivotally connected at their upper ends to said oscillating members, a like plurality of parallel upper sheaves pivoted to the lower ends of said hangers, a set of lower sheaves pivoted to said load, the two outer suspension cables being arranged to track directly into the outer lower sheaves and being connected to form an intermediate rigging section arranged to track between said lower and upper sheaves in alternation.

In testimony whereof, I have subscribed my name.

LOUIS B. ERWIN.